United States Patent
Neuenschwander

[19]

[11] Patent Number: 5,918,359
[45] Date of Patent: Jul. 6, 1999

[54] APPARATUS FOR MANUFACTURING AN INTERLOCKED CORE SPACED FOR ANNEAL PENETRATION

[75] Inventor: Thomas R. Neuenschwander, Fort Wayne, Ind.

[73] Assignee: L.H. Carbide Corporation, Fort Wayne, Ind.

[21] Appl. No.: 08/262,231

[22] Filed: Jun. 20, 1994

Related U.S. Application Data

[62] Division of application No. 07/903,372, Jun. 24, 1992, Pat. No. 5,349,741.

[51] Int. Cl.$^6$ .................................................. H02K 15/02
[52] U.S. Cl. .............................. 29/564.2; 29/596; 29/598; 29/736
[58] Field of Search .................. 29/596, 598, 609, 29/33 L, 33 Q, 564.1, 564.2, 564.6, 736; 310/42

[56] References Cited

U.S. PATENT DOCUMENTS

| | | |
|---|---|---|
| 3,027,628 | 4/1962 | Wilk . |
| 3,186,066 | 6/1965 | Metzger, Jr. . |
| 4,438,558 | 3/1984 | Mitsui . |
| 4,538,345 | 9/1985 | Diederichs . |
| 4,619,028 | 10/1986 | Neuenschwander . |
| 5,338,996 | 8/1994 | Yamamoto ............................ 310/217 |

*Primary Examiner*—Carl E. Hall
*Attorney, Agent, or Firm*—Baker & Daniels

[57] ABSTRACT

A process and apparatus for manufacturing lamina stacks used to form rotor or stator cores for electric motors. In the process of forming a plurality of blanked lamina, a blanking and tacking machine forms dimples in the laminas prior to coaxially stacking the laminas. The lamina may also include interlocking portions so that the lamina stack may be interlocked. The dimples are located at offset positions relative to adjacent laminas to cause the laminas of the stack to be spaced apart. The spaced apart stack may be subject to annealing which relieves metal stress in the stack and causes the formation of a desired non-conductive layer on the surfaces of the laminas. The annealed lamina stack may then be compressed to bring the laminas into abutting relation to be subsequently manufactured into rotor or stator cores.

9 Claims, 4 Drawing Sheets

APPARATUS FOR MANUFACTURING AN INTERLOCKED CORE SPACED FOR ANNEAL PENETRATION

This is a division of application Ser. No. 07/903,372, filed Jun. 24, 1992 now U.S. Pat. No. 5,349 741.

BACKGROUND OF THE INVENTION

1. Field of the Invention.

The present invention relates to the structure and manufacture of laminated parts used in electric motors or generators. More particularly, the field of the invention is that of laminas adapted to be stacked and used in the manufacture of rotors and stators.

2. Description of the Related Art.

Rotor and stator manufacture employing stacked laminas is well known in the art. Typically, the laminas are blanked from continuous strip stock and then stacked and bound together to form the rotor or stator. Progressive die assemblies for producing stator or rotor laminations are well known, wherein a strip of lamination material is fed through a sequence of punching steps to progressively form the laminas to the desired end configuration. It is also well known to form arcuate interlock tabs in the laminas which extend below the lamina lower surface and engage a slot formed in the next lower lamina. In this manner, a plurality of laminas may be formed from a single strip stock and interconnected by means of the interlock tabs.

Stator stacks include openings around the inner periphery of the stack which are shaped to receive the stator windings, with the openings extending longitudinally straight down the bound stator stack. The laminas of the rotor, however, include a plurality of skewed conductor slots which are formed around the periphery of the rotor stack in arcuately spaced relation to one another, by rotationally indexing the laminas with respect to the rotor stack. Indexing involves rotating the rotor stack with respect to the last produced lamina by a predetermined rotational increment so that, when the laminas are combined in a stack, the space defined by adjacent conductor slots are skewed or slanted relative to the stack axis. Skew inaccuracies and/or excessive adjustment time results from many prior art systems. Also, variations in the thickness of the lamina may cause unbalanced stacks to be formed. In order to compensate for these problems, a system for compensating for the nonuniform thickness was developed which rotates the stacked laminas to compensate for variations in thickness while still properly skewing the conductor slots, as described in U.S. Pat. Nos. 4,738,020; 4,619,028; 5,087,849 and U.S. patent application Ser. No. 07/724,866, filed Jul. 21, 1991, entitled "APPARATUS AND METHOD FOR MANUFACTURING LAMINATED PARTS", now U.S. Pat. No. 5,123 155 all assigned to the assignee of the present invention and which disclosures are incorporated herein by reference.

However, the laminas must be electrically insulated from each other in order to function properly in electric motors or generators. One known method involves the use of an annealing oven to treat the individual laminas so that a thin non-conductive or insulative layer forms on the generally planar surfaces of the laminas, e.g., an oxidation layer formed by bluing or annealing. Another beneficial effect of the annealing oven is that many of the internal stresses are removed from the laminas, and the grain of the metallic material of the laminas is reoriented.

In order to form the insulative or non-conductive layer, each individual lamina must be sufficiently spaced apart between the planar surfaces of the laminas. Although the strip stock may be annealed prior to punching, any subsequent cutting or bending in the manufacture of the laminas may create gaps in the non-conductive layer and/or further stress the material. Therefore, the laminas are conventionally subject to annealing after they are manufactured and stacked. One known method involves the use of spacers which are positioned between the laminas, or coating on the laminas, which burn off in the annealing oven. Another known method involves only loosely stacking the laminas so that the planar surfaces are not held together and thus do not block fluids or the oven atmosphere from contacting the planar surfaces.

However, these known methods contain inherent deficiencies. Spacers positioned between laminates tend to burn off in the annealing oven and produce fumes which may interfere or contaminate the oxidation or other process which forms a non-conductive layer on each planar surface. Subjecting loose stacks to annealing causes thermal expansion which often misaligns the stacks and introduces errors in subsequent manufacturing.

What is needed in the art is a lamina stack structure which may be successfully annealed.

An additional need exists for such a lamina stack which may be successfully treated in an annealing oven without creation of products of combustion.

Also needed is a lamina stack structure which may withstand the temperatures of the annealing oven with structural integrity.

Further needed is a method of manufacturing such a lamina stack structure.

Another need is for an apparatus for manufacturing such a lamina stack structure.

SUMMARY OF THE INVENTION

The present invention relates to the manufacture of laminas for forming lamina stacks which are used to produce rotors and stators for electric motors. The lamina stacks are conventionally formed by blanking and stacking. By forming dimples in the lamina, the stacked laminas are spaced apart so that substantially all of the lamina surfaces may be exposed to the ambient atmosphere during an annealing treatment. This spaced apart lamina stack structure greatly facilitates manufacture of rotors and stators, thus providing more reliable and less expensive components for electric motors.

The present invention contemplates the use of a machine having a blanking station which forms dimples in the lamina so that the stacking station creates lamina stacks which are spaced apart by the dimples. The laminas are stacked together about a common axis, and the offset dimples on adjacent laminas abut the generally planar lamina surfaces. The surfaces of the laminas are thus in fluid communication with the ambient atmosphere for annealing.

The lamina stack structure facilitates formation of a non-conductive layer on the exposed lamina surfaces by maintaining separation of the laminas during the annealing treatment. The treated lamina stack may then be compressed to form the core of an electric motor stator or rotor. The compressed stack thus includes a plurality of electrically insulated laminas defining slots within which a conductive material may be disposed to complete the stator or rotor.

The lamina stack may be coaxially arranged and provided with interlocking portions so that the lamina stack is held together and may be easily moved from the blanking and stacking machine to the annealing oven. Further, after annealing the spaced apart and interlocked lamina stack, the stack may be compressed by applying a compression force to the stack in a direction parallel to or coincident with the common axis. Once compressed, the laminas in the stack are in a closely spaced relation, and are tightly held together by virtue of the interlocked portions. Further, the laminas are electrically insulated by virtue of oxidation which creates non-conductive layers on the outer surfaces during the annealing process.

The present invention, in one form, is a method of manufacturing laminated parts wherein the laminas for forming a part are blanked from sheet stock material and have a spacing portion formed at predetermined locations. The laminas are next subject to annealing while all the lamina surfaces are spaced apart by the spacing portions.

The present invention, in another form, is a machine for manufacturing electric motor parts from a sheet of stock material. The machine includes a blanking station, a device for guiding sheet stock material to the blanking station, a device for blanking generally planar laminas from the sheet stock material, and a device for forming spacing portions in the generally planar laminas wherein each of the laminas have surfaces which when positioned adjacently are separated from adjacent lamina surfaces by the spacing portions.

The present invention, in yet another form, is an apparatus for forming a core of an electric motor stator or rotor. The apparatus includes a plurality of laminas stacked together about a common axis, each lamina having generally planar surfaces. The laminas have a plurality of dimples extending from one of the generally planar surfaces, with the laminas and dimples arranged so that each dimple extends to an adjacent lamina surface. The laminas are thereby spaced apart from adjacent laminas by the dimples whereby substantially all of the generally planar surfaces are in fluid communication with the ambient atmosphere so that the generally planar surfaces may be subject to annealing while in the stacked, spaced apart position.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
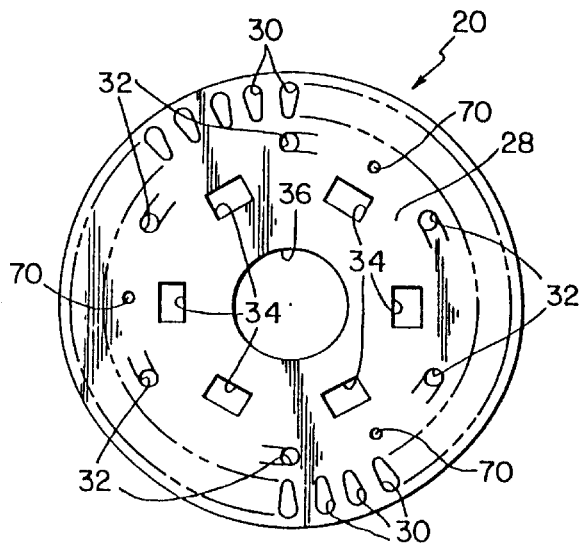
FIG. 1 is a top view of a rotor lamina of the present invention.
Figure 2:
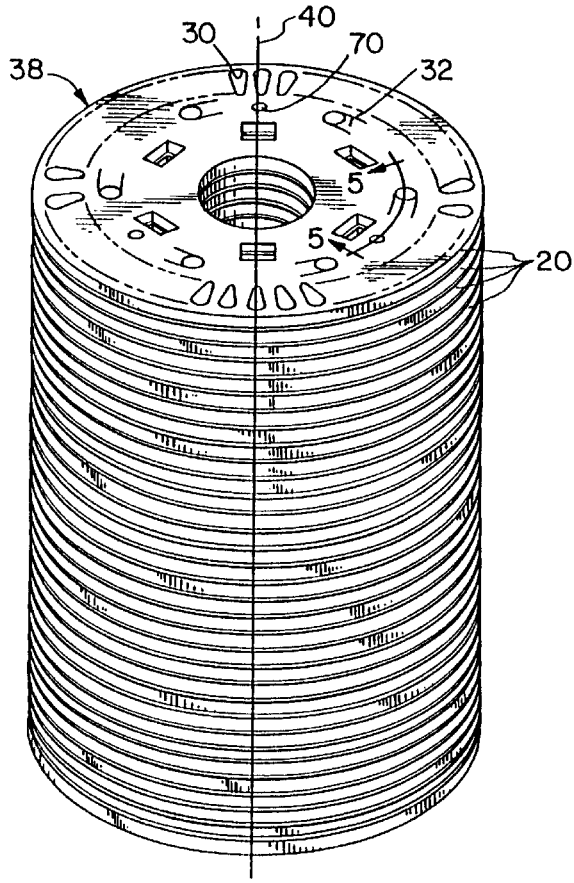
FIG. 2 is perspective view of an interlocked stack of rotor laminas.

The present invention relates to the structure and manufacture of rotors and stators for electric motors. For purposes of description, the following description relates primarily to rotor lamina 20 of FIGS. 1 and 2, although the manufacturing method for rotor lamina 20 is generally applicable to stator lamina 22 shown in FIG. 3. Furthermore, lamina stack 24 shown in FIGS. 4 and 6 may be comprised of either rotor laminas 20 or stator laminas 22; and interlocking structure 26 shown in FIG. 5 may be comprised of either rotor laminas 20 or stator laminas 22.

Rotor lamina 20 has generally planar upper surface 28 and a generally planar lower surface (not shown in FIGS. 1 and 2), and is formed with numerous openings and depressions. Lamina 20 includes a plurality of teardrop shaped slot openings 30 spaced about and adjacent the perimeter of rotor lamina 20; a plurality of interlock apertures 32 arcuately spaced about a circular arc and inwardly relative the perimeter; a plurality of oblong vent openings 34 arcuately spaced and inwardly relative to apertures or holes 32; and a central shaft hole 36. The series of shaft holes 36 in rotor stack 38 of FIG. 2 defines central axis 40.

Figure 5:
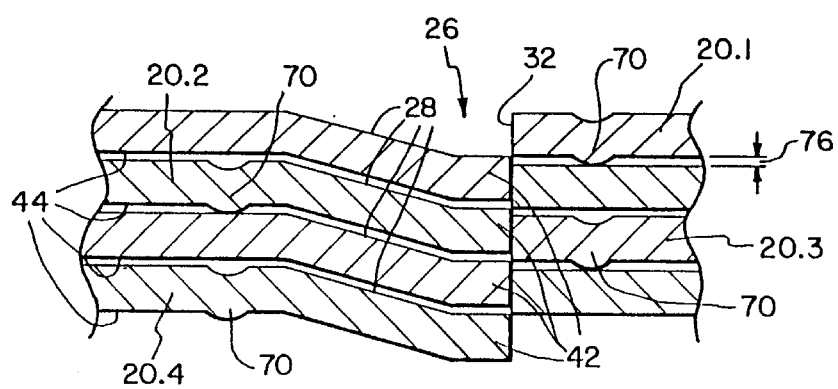
FIG. 5 is a partial cross-sectional view, taken along arcuate line 5—5 of FIG. 2, of an interlocked spaced apart stack.

Rotor stack 38 may be held together by interlocking structure 26 of FIG. 5. Each rotor lamina 20 excepting the bottom lamina of stack 38 has a plurality of arcuate interlock tabs 42 depressed from lamina lower surface 44 adjacent to interlock apertures 32. Each interlock tab 42 engages a corresponding hole 32 in the next lower lamina of the stack in a manner well known in the art. The bottom lamina of the stack may have the interlock tabs 42 blanked and removed to avoid interlocking of the lowermost lamina with its adjacent next lower lamina which forms the top lamina of the prior stack.

Each rotor lamina 20 is arcuately displaced about axis 40 from the lamina next below it before the two laminas are interlocked in a manner such that the longitudinal space defined by successively rotated slots 30 has the desired skew angle (oriented either left-to-right or right-to-left) relative to axis 40. The skewed longitudinal space formed by slots 30 is conventionally used to accommodate a conductive material so as to provide rotor core conductive bars as is well known in the art.

Figure 8:
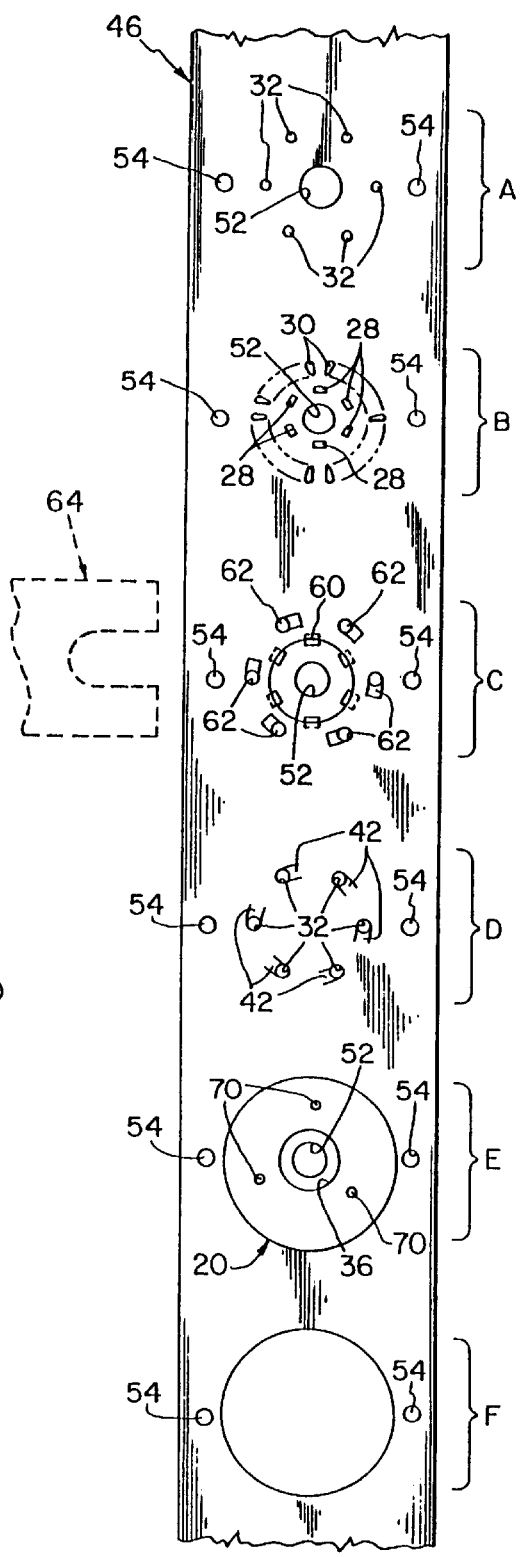
FIG. 8 is a top view of a blanked piece of strip stock.
Figure 7:
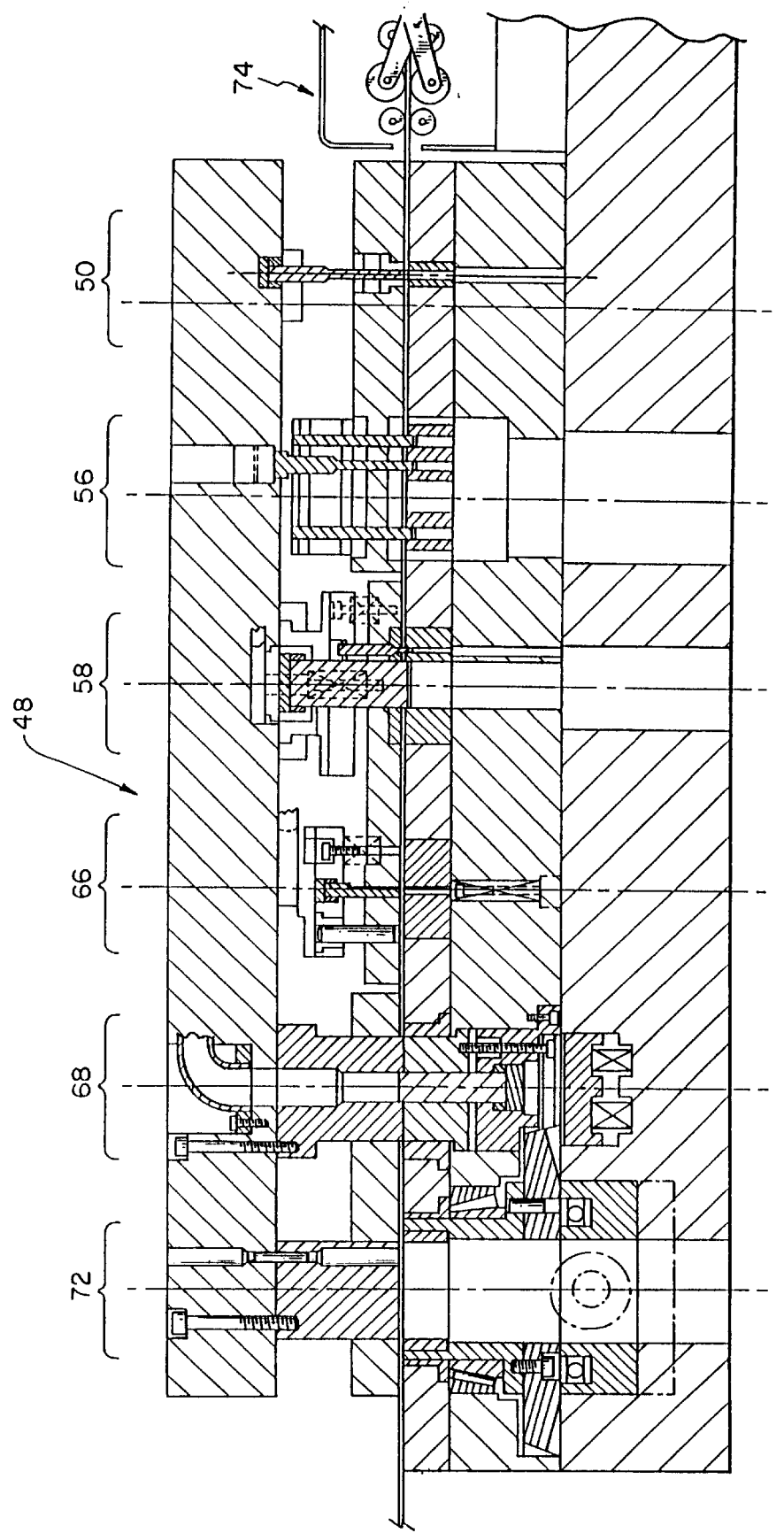
FIG. 7 is a side elevational view of an apparatus for manufacturing the laminas of the present invention.

Rotor lamina 20 are manufactured from a sheet of strip stock material 46 as shown in FIG. 8, which shows the results from the six stations of blanking and assembling or stacking apparatus 48 of FIG. 7. Portion A of strip stock 46 represents the results of first station 50, wherein holes 32, shaft pilot hole 52, and guiding holes 54 are blanked. Portion B of strip stock 46 represents the results of second station 56, wherein thirty four slot openings 30 and six vent openings 28 are blanked. Portion C of strip stock 46 represents the results of third station 58, wherein counterbore opening 60 and tab openings 62 may be blanked for laminas in the bottom portion of stack 38. A pneumatically actuated solenoid assembly, generally indicated by the dashed line at 64, includes a spring biased plate and solenoid arms with a plurality of punch pins which may be alternately positioned to blank or avoid strip stock 46. Portion D of strip stock 46 represents the results of fourth station 66, wherein interlock tabs 42 are depressed below lower surface 44. Portion E of strip stock 46 represents the results of fifth station 68, wherein central shaft hole 36 is blanked, dimples 70 are formed, and lamina 20 is blanked and subsequently realigned with strip stock 46. Portion F represents the results of sixth station 72, wherein lamina 20 is pushed through strip stock 46 and into a choke ring die barrel (not shown) which is rotated to an angular increment to obtain the desired skew angle of slots 30.

Apparatus 48 of FIG. 7 includes the stations mentioned above and generally corresponds to the apparatus disclosed in the aforementioned U.S. Pat. Nos. 4,738,020; 4,619,028; 5,087,849 and copending U.S. patent application Ser. No. 07/724,866. As disclosed in those patent documents, apparatus 48 may include a guiding mechanism 74 which not only introduces strip stock 46 into first station 50, but also may include means (not shown) so that sixth station 72 may rotate selected laminas an additional 180° to compensate for thickness variations of strip stock 46. In addition to the functions of the stations of the previously disclosed apparatus, apparatus 48 of the present invention includes a mechanism, preferably in fifth station 68, which forms spacing structures, here shown as dimples 70 in lamina 20. In order to keep dimples 70 from interfering with each other, fifth station 68 is arranged to form three dimples 70 in the position shown in FIG. 1 for every first lamina, while three similarly configured dimples are formed in every second lamina and are offset from the arcuate positions of the previous dimples, for example by 60°. Given this arrangement, each set of dimples contacts a generally planar surface on each adjacent lamina.

Figure 4:
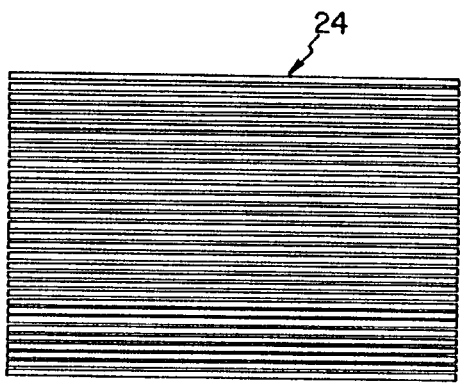
FIG. 4 is a side view of a stack of interlocked laminas of the present invention.

In accordance with the present invention, rotor laminas 20 include depressions or dimples 70 as shown in detail in FIG. 5. Each dimple 70 formed in lamina 20 includes a depression on upper surface 28 and a protrusion from lower surface 44. In order to prevent the protrusion of an upper dimple from nesting in the depression of a lower dimple, dimples 70 formed in laminas 20.1 and 20.3 are arcuately offset from dimples 70 formed in laminas 20.2 and 20.4. One method of offsetting dimples 70 is to have their locations arcuately spaced so that a 180° rotation of every other lamina 20 provides the desired offset arrangement. An alternative method of offsetting dimples 70 is to provide two sets of dimple-forming dies which are alternately actuated by a cam mechanism or the like. The selective formation of dimples 70 ensures that adjacent laminas in stack 24 of FIG. 4 are separated by gap 76. After the processing of sixth station 72, interlocked stack 24 has all of its laminas spaced apart by dimples 70 so that it may be subject to a bluing or annealing process in an annealing oven.

Figure 3:
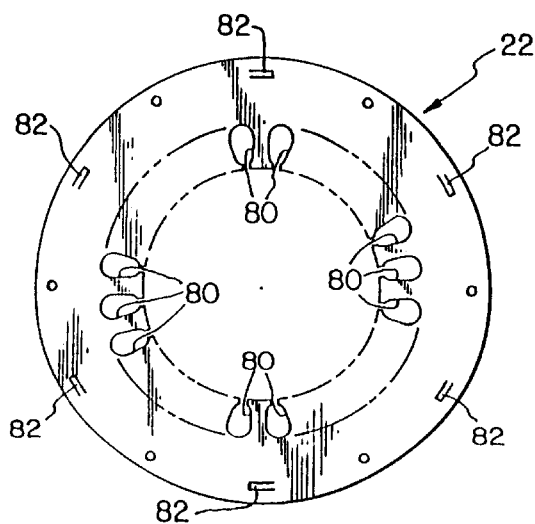
FIG. 3 is a top view of a stator lamina.

An alternative embodiment of the present invention is shown in FIG. 3, as the aforementioned manufacturing may be applied to stator lamina 78 as well as to rotor lamina 20. Stator lamina 78 includes a plurality of cell slots 80 arranged around the inner periphery of lamina 78, a plurality of interlock tabs 82 arranged around the outer periphery of lamina 78, and a plurality of dimples 84 also arranged around the outer periphery of lamina 78. Dimples 84 are also positioned on adjacent laminas 78 similarly to the offset arrangement described above for rotor laminas 20. The manufacturing process for formation of a stack of stator laminas 78 is similar to that described above for rotor laminas 20, except that at sixth station 72, the stator stack 78 is not rotated relative to the last formed laminas, as the longitudinal spaces defined by cell slots 80 are typically desired to be parallel with the central axis of the stack.

Figure 10:
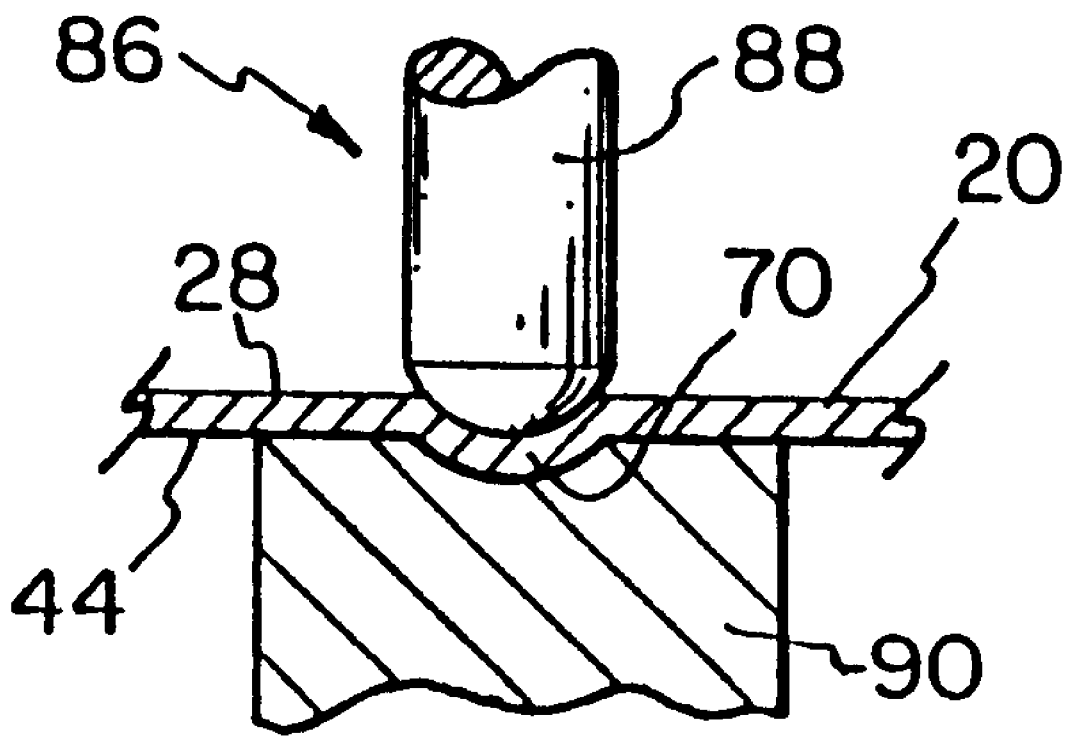
FIG. 10 is a side view, in partial cross-section, of the dimple forming punch and lamina.

In accordance with the present invention, apparatus 48 includes dimple die assembly 86 which is shown in FIG. 10. Hemispherical punch 88 is actuated to form dimple 70 in lamina 20. The head of punch 88 forms a hemispherically shaped depression in upper surface 28, while lower surface 44 conforms to the shape of female die 90 so that dimple 70 extends a predetermined distance from the generally planar lower surface 44.

Figure 9:
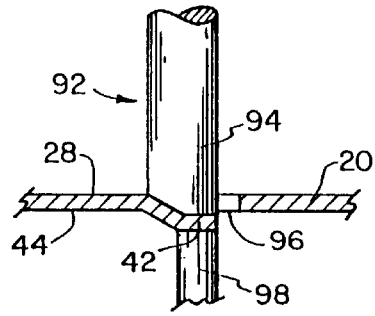
FIG. 9 is a side sectional view of the interlock forming punch and a lamina.

In interlock die assembly 92 of FIG. 9, interlock die press 94 pushes tab 42 down farther down from lower surface 44, as tab 42 is pressed down against stop 98. The resulting structure includes holes 32 which function as an interlock recess so that when laminas 20 are pressed together, tabs 42 are interlocked with holes 32 in the next lamina. The formation of dimples 70 in rotor laminas 20 is preferably performed after formation of interlock tabs 42 because the additional height provided by dimples 70 may interfere with the proper spacing of tabs 42. Thus, interlock die assembly 92 is preferably located at fourth station 58 while dimple die assembly 86 is preferably located at fifth station 68.

The manufacturing process required to form lamina stack 24 generally comprises forming laminas by blanking a strip stock material and then stacking the laminas. Strip stock 46 is guided into apparatus 48 by guiding mechanism 74, and is blanked at first through four stations 50, 56, 58, and 66 as described above. A plurality of dimples are formed at predetermined locations of a lamina in fifth station 68. Then the laminas are stacked to form a lamina stack, wherein the laminas are spaced apart by the dimples. Lastly, the lamina stack is subject to annealing while all the lamina surfaces in the lamina stack are spaced apart.

In accordance with the present invention, after formation in apparatus 48 lamina stack 24 shown in FIG. 4 is subject to bluing annealing in a conventional manner. The heat treatment of the annealing process relieves the internal stresses of lamina stack 24 which may be disposed in various manners, such as horizontally on an array or an arbor (not shown) or vertically positioned or stacked in the annealing oven (not shown). During this annealing, dimples 70 separate adjacent surfaces of lamina 20 so that both upper surfaces 28 and lower surfaces 44 are in fluid communication with the ambient atmosphere. Bluing is caused by exposure to the ambient atmosphere within the annealing oven and results in formation of an insulative oxidation layer on outer surfaces 28 and 44 of laminas 20. However, other gases may be used in the annealing oven to form nonconductive layers, if desired.

Figure 6:
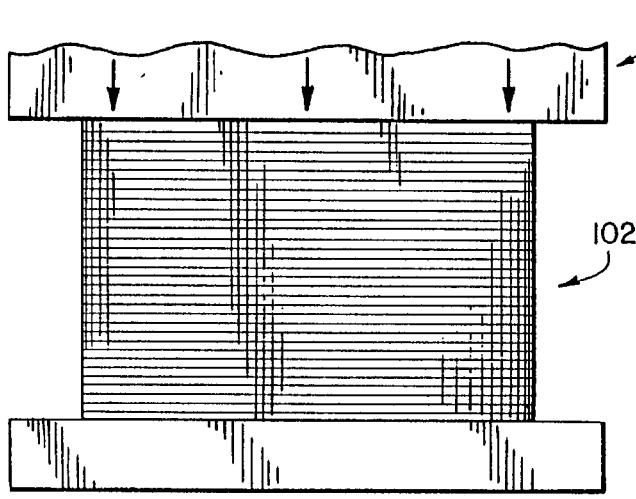
FIG. 6 is a side view of an interlocked stack after compression.

After the annealing process, the spaced apart lamina stack 24 of FIG. 4 is compressed by a press 100 of FIG. 6 to form compressed lamina stack 102, and the compression provided by press 100 may be set to a predetermined pressure to provide the desired integrity of stack 102 and the desired deformation of dimples 70. After compression, rotor stack 102 is ready to have conductive slots filled in with conductive material in a die casting machine or other conventional mechanism to form a fully functional rotor core. Hydraulic press 100 may also include an arbor (not shown) to extend through the open central axis of the lamina stack to ensure proper alignment of the stack during compression.

In the preferred embodiment, dimples 70 extend about 0.002 to 0.005 inches below lower surface 44. Also, interlock tabs 42 extend about the same extent as the thickness of the strip stock material used, which typically falls within the range 0.020 to 0.025 inches. The exact number and spacing of the various lamina slots, openings, and dimples may be varied according to the desired motor configuration as is well known in the art.

It should be understood that, while the spacing structures have herein been illustrated as dimples, other forms of spacing structures are contemplated by this invention. Thus, any structure is contemplated which will separate the laminas and which can be removed by compression after the stack has been annealed. Also, although the disclosed structure includes interlocking laminas, the principles of the present invention are readily adaptable to non-interlocking lamina dies. For example, after annealing stator laminas, the stator core may be held together by welding, by keying, or by the slot cell material, windings, and any bonding agent like varnish.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for manufacturing electric motor parts from a sheet of stock material, said apparatus comprising:

a blanking station;

first means for guiding sheet stock material to said blanking station;

second means at said blanking station for blanking generally planar laminas from said sheet stock material;

third means for forming spacing means in said generally planar laminas at predetermined locations thereof; and fourth means for relatively rotating said laminas so that said spacing means of adjacently positioned laminas are offset whereby each of said laminas have surfaces which when positioned adjacently are separated from adjacent lamina surfaces by said spacing means.

2. The apparatus of claim 1 further comprising means for stacking said laminas to form a lamina stack.

3. The apparatus of claim 2 wherein each said lamina has an axis substantially perpendicular to the laminar plane, and said lamina stack has a central axis substantially coaxial with said lamina axes.

4. The apparatus of claim 2 further comprising means for forming interlocking means in said generally planar laminas, and said stacking means interlocks adjacent laminas in said lamina stack to form an interlocked lamina stack.

5. The apparatus of claim 1 wherein said third means includes means for forming dimples.

6. An apparatus for manufacturing electric motor parts from a sheet of stock material, said apparatus comprising:

a blanking station;

first means for guiding sheet stock material to said blanking station;

second means at said blanking station for blanking generally planar laminas from said sheet stock material;

third means for forming dimples in said generally planar laminas at predetermined locations thereof; and fourth means for relatively rotating said laminas so that said dimples of adjacently positioned laminas are offset whereby each of said laminas have surfaces which when positioned adjacently are separated from adjacent lamina surfaces by said dimples.

7. The apparatus of claim 6 further comprising means for stacking said laminas to form a lamina stack.

8. The apparatus of claim 7 wherein each said lamina has an axis substantially perpendicular to the laminar plane, and said lamina stack has a central axis substantially coaxial with said lamina axes.

9. The apparatus of claim 7 further comprising means for forming interlocking means in said generally planar laminas, and said stacking means interlocks adjacent laminas in said lamina stack to form an interlocked lamina stack.

* * * * *